US007093350B2

(12) United States Patent
McNeelege et al.

(10) Patent No.: US 7,093,350 B2
(45) Date of Patent: Aug. 22, 2006

(54) TRUSS FABRICATION SYSTEM WITH OBSTRUCTION DETECTION DEVICE

(75) Inventors: Glenn Eugene McNeelege, St. Peters, MO (US); Kathy Liuhui Jin, Chesterfield, MO (US); Eugene M. Toombs, IV, St. Louis, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 168 days.

(21) Appl. No.: 10/680,506

(22) Filed: Oct. 7, 2003

(65) Prior Publication Data

US 2005/0071995 A1 Apr. 7, 2005

(51) Int. Cl.
*B23P 21/00* (2006.01)

(52) U.S. Cl. ........................... 29/706; 29/708; 29/709; 29/714; 29/798; 29/897.31; 29/281.3; 100/910; 100/210; 100/341; 100/342

(58) Field of Classification Search ................. 29/432, 29/798, 2, 281.3, 897.31, 407.01, 407.04, 29/706, 708, 709, 714, 772; 100/913, 210, 100/341, 342, 348; 269/910
See application file for complete search history.

(56) References Cited

U.S. PATENT DOCUMENTS 3,538,843 A * 11/1970 Lubin ......................... 100/353
4,295,269 A * 10/1981 Wright ........................ 29/798
4,669,184 A * 6/1987 Castillo ...................... 29/798
5,048,409 A 9/1991 Schulz
5,092,028 A * 3/1992 Harnden ...................... 29/709
5,111,861 A * 5/1992 Gore et al. ............. 144/256.1
5,211,108 A * 5/1993 Gore et al. ................... 100/48
5,582,099 A 12/1996 Rosser
6,079,325 A 6/2000 LePoire et al.
6,318,251 B1 11/2001 Schulz
6,560,858 B1 * 5/2003 McAdoo ...................... 29/772
6,612,230 B1 9/2003 McAdoo et al.
6,807,903 B1 * 10/2004 Anderson .................. 100/210

FOREIGN PATENT DOCUMENTS

EP 253000 A1 * 1/1988

OTHER PUBLICATIONS

Mitek Industries, Inc, “MiTek® RoofGlider®, Trackless Roof Truss Roller System”, © 1998, (pp. 1-4), 14515 North Outer Forty, Chesterfield, MO 63017.

* cited by examiner

*Primary Examiner*—Jermie E. Cozart
(74) *Attorney, Agent, or Firm*—Senniger Powers

(57) ABSTRACT

A truss fabrication system for fabricating trusses includes a table, a gantry press and an obstruction detection device. A top of the table receives truss components arranged with at least some connector plates engaging at least some of the truss members. The gantry press includes a gantry mounted for movement along a path relative to the table for pressing the connectors into the truss components for joining the truss members together. An obstruction detection device is mounted on the gantry for detecting obstructions in the path of the gantry. The detection device defines a vertical detection plane located a predetermined distance from the gantry and is adapted to detect the presence of all obstructions entering the plane at substantially the same time for stopping movement of the gantry.

16 Claims, 5 Drawing Sheets

TRUSS FABRICATION SYSTEM WITH OBSTRUCTION DETECTION DEVICE

BACKGROUND OF THE INVENTION

This invention relates generally to truss fabrication systems, and in particular to an obstruction detection device for a truss fabrication system.

Pre-manufactured structural frameworks, such as trusses, are widely used in the construction industry for forming a roof, wall panel, floor, or other building component. Each truss includes a collection of wooden, plastic, or metallic truss members held together by connectors, such as nailing plates. The trusses are assembled to the correct specifications at a factory and then shipped to a construction site. A truss fabrication system is frequently used to facilitate efficient assembly of the truss. It features a table on which the truss members and connectors are placed at desired relative positions to form the particular truss configuration. A gantry press then travels along the table to press the connectors into the truss members thereby joining them together. Typically, the gantry press includes a cylindric roller mounted on a gantry. The gantry has wheels which run on tracks or guides located on the sides of the table or on the floor next to the sides of the table. After traversing the length of the table, the roller apparatus continues moving along the guides and is stopped in a parking area at an end of the table such that the assembled truss can be freely removed from the table without obstruction by the roller apparatus.

Gantry presses are equipped with devices to detect obstructions in the path of the gantry press and to stop the press. For example, many gantry press devices have a single, horizontal rod supported outwardly from the press for detecting obstructions along the path of travel. The horizontal rod is typically supported at its ends by two inclined arms pivotally mounted near the base of each of the opposite sides of the gantry. The horizontal rod extends the approximate length of the gantry press and is positioned such that the truss table and any truss components thereon may pass under the rod without being contacted. The rod is coupled with a motor shut-off switch to stop the gantry press from traveling along the pathway when the rod is pivoted upward as a result of either the rod or the arms encountering an obstruction.

SUMMARY OF THE INVENTION

In general, a truss fabrication system for fabricating trusses from truss components comprises a table and a gantry press. The truss components include truss members and connectors for joining together the truss members. The table includes a table top and legs supporting the table top and extending to the floor. The table top is adapted to receive truss components arranged with at least some connectors engaging at least some of the truss members. A gantry press includes a gantry mounted for movement along a path relative to the table over the upper surface for pressing the connectors into the truss members for joining the truss members together, a side portion of the gantry being located on a side of the table, a motor for driving movement of the gantry relative to the table, and an obstruction detection device mounted on the gantry for detecting obstructions in the path of the gantry. The detection device defines a vertical detection plane located a predetermined distance from the gantry. The detection device is adapted to detect the presence of all obstructions entering the plane at substantially the same time for stopping movement of the gantry.

In another aspect, a gantry roller press, used to press connector plates into truss members on a truss assembly table as the gantry roller press moves over the table along a path, comprises a gantry having first and second opposite side portions, a roller rotatably mounted on the gantry for rotation relative to the gantry, a motor for driving rotation of the roller, and an obstruction detection device mounted on the gantry for detecting obstructions in the path of the gantry. The first and second side portions of the gantry are adapted for location on respective opposite sides of the table. The detection device defines a vertical detection plane located a predetermined distance from the gantry. The detection device is adapted to detect the presence of all obstructions entering the plane at substantially the same time for stopping movement of the gantry.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENTS

Figure 1:
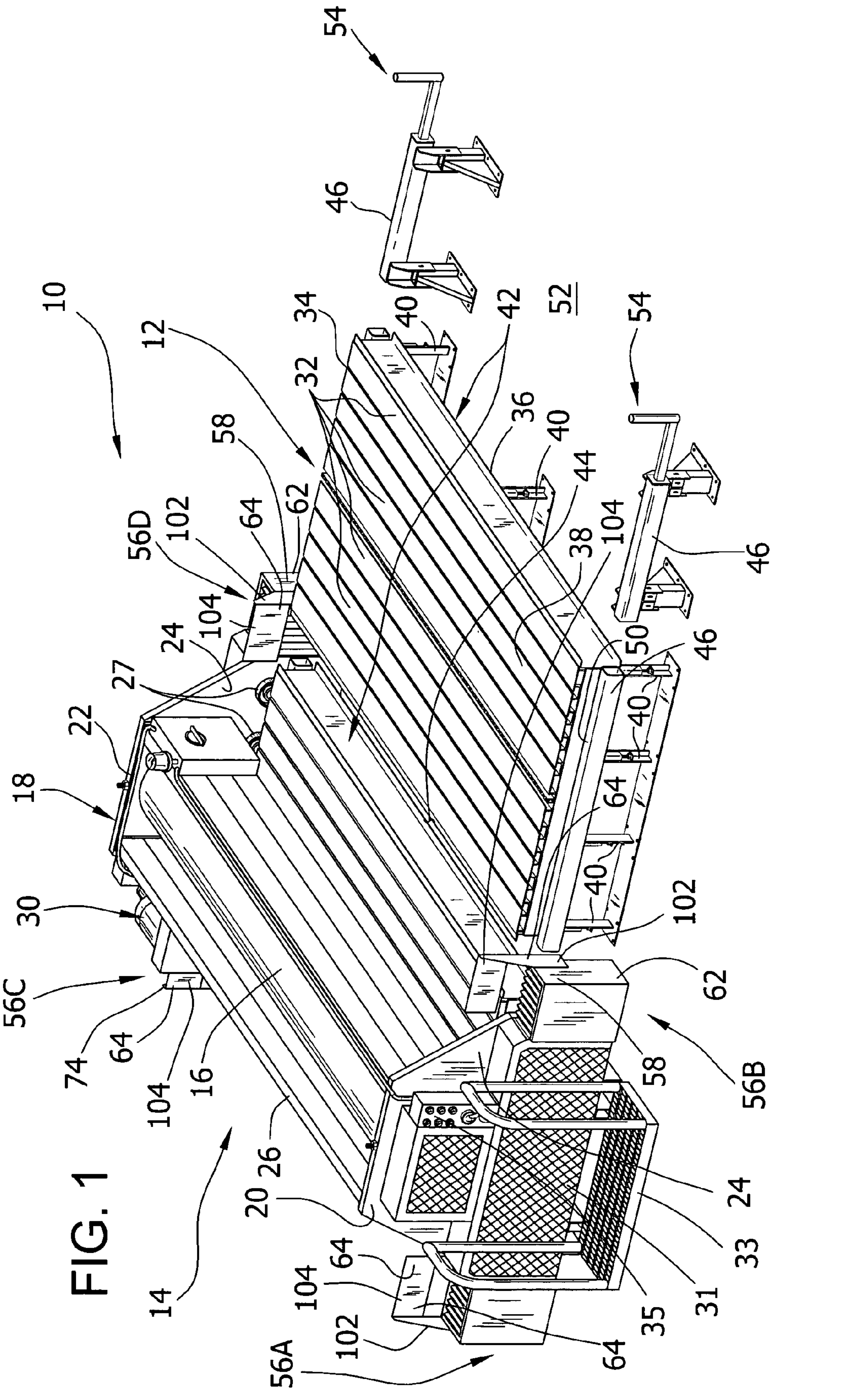
FIG. 1 is a perspective of a truss fabrication system having obstruction detection devices of the present invention.

Referring now to the drawings and in particular to FIG. 1, a truss fabrication system for fabricating trusses according to the present invention is indicated generally at 10. The system includes a truss table (indicated generally at 12) on which truss components including truss members and connector plates (not shown) may be positioned at a desired configuration for joining together truss members to form a truss. The truss members are typically wooden boards which form the chords and frequently also the web of the truss. A gantry roller press, indicated generally at 14, is movable relative to the truss table 12 and has a roller 16 configured to press one or more connector plates (broadly, "connectors") into the truss members to connect the truss members. The roller 16 is mounted for rotation on a gantry (generally indicated at 18) and extends between a first side portion 20 and a second opposite side portion 22 of the gantry. The side portions are each formed in part by a generally vertically oriented plate 24 interconnected with the opposite side portion by horizontal spacers 26 extending between the side portions. The plates 24 each mount wheels including drive wheels 27 (only two of which are shown) capable of moving the gantry press 14. The drive wheels 27 and roller 16 are connected in a conventional manner by one or more drive chains 28 (FIGS. 4–7) to a motor system indicated generally at 30. Attached to each of the plates 24 is a housing 31 enclosing the drive wheels 27, the drive chains 28 and associated gears. Adjacent at least one of the housings 31 is a controller stand 33 for use by a controller during operation of the gantry press 14 to control the gantry press using the control panel 35. The gantry press 14 can have other configurations, such as being guided by floor rails or truss table side rails or without controller stand, without departing from the scope of this invention.

The truss table 12 has a plurality of parallel, elongate panels 32 providing a worksurface for placement of truss members. Slots 34 are left between adjacent pairs of panels 32 suitable for placement of conventional positioning stops (not shown) capable of being fixed anywhere along the slot to collectively form a jig for locating and holding truss members on the worksurface. The elongate panels 32 are mounted on a frame 36. The panels 32 and frame 36 form a table top 38 supported by a plurality of legs 40. The legs are desirably adjustable in length and are fixedly attached to an underlying surface (not shown).

The truss table 12 includes two spaced sections (indicated generally at 42) of the table which are aligned in a row. The table 12 may be a single section, or may include more than two sections without departing from the scope of the present invention. During operation, truss members may rest solely on one section 42, or if larger may extend across several sections. A space 44 between adjacent sections is sized for a person to walk in between the sections 42 to set up the truss members and connectors, with a typical spacing being 15 inches. However, no space may be provided between adjacent sections without departing from the scope of this invention. In the preferred embodiment, each section 42 has four legs 40. Other numbers and types of legs do not depart from the scope of this invention.

Two wheel guides 46 are securely mounted on the frame 36 opposite sides of each truss table section 42. The gantry press 14 is capable of traversing the space 44 between the wheel guides 46 of adjacent sections 42 as it travels from one end of the table 12 to the other as set forth in U.S. Pat. No. 6,079,325. The guides 46 are provided for supporting and directing movement of the gantry press 14 relative to the truss table 12. Each guide 46 comprises a suitably shaped elongate box beam extending generally along the table and which provides tracks for engagement by drive wheels and reaction pressure wheels (not shown) of the gantry press 14. For instance, in one embodiment, each guide 46 is formed of a five inch by five inch square steel beam. An upper surface 50 of the guide 46 is generally flat and provides a track for the drive wheels. A lower surface (not shown) of the guide is also generally flat and provides a track for the pressure wheels. It is understood that there could be other types and locations of guides (including on the floor), or only one guide, without departing from the scope of this invention.

A parking area 52 at one end of the table includes a pair of stands (each designated generally at 54) aligned with and spaced from the endmost section of the truss table 12. The stands 54 include guides 46 which receive the drive wheels 27 and the pressure wheels for supporting the gantry press 14 away from the table sections 42. After the gantry press has traveled along the length of the truss table, it moves onto the stands 54 in the parking area 52 where it may be stopped and where it does not overlie the assembled truss so as to not interfere with removal of the truss or placement of truss members and connectors for a new truss. An additional parking area (not shown) may be provided on an opposite end of the truss table 12.

When the motor system 30 is activated, the drive wheels move the gantry press 14 until the roller 16 rolls onto the surfaces of the truss members and connectors, raising the gantry press. At that point, the drive wheels 27 become substantially unloaded, with the weight of the gantry press 14 bearing on the roller 16. The reaction pressure wheels (not shown) augment a pressing force imparted by the roller to the connectors (i.e., beyond the weight of the gantry press), by engaging an underside of the guides 46 and strongly opposing substantial upward movement of the roller 16 when rolling over truss members. The connectors are pressed into the truss members as the roller passes over them.

First, second, third and fourth obstruction detection devices (indicated generally at 56A, 56B, 56C, 56D) are mounted on the gantry press 14 for detecting obstructions O in the path of the gantry press. Each detection device 56 detects all obstructions O (see FIGS. 3–5) entering a vertical detection plane 58 at substantially the same time for stopping movement of the gantry 18 prior to the obstruction being struck by the gantry. The vertical detection plane 58 is defined at least in part in the illustrated embodiment by an outer surface of a detection plate 62 located a predetermined distance from the gantry 18 and generally perpendicular to the path movement of the gantry press 14. In the illustrated embodiment, the detection plate 62 has a height of approximately 24 inches and a width of approximately 9 inches. The plate 62 extends down in close proximity to the floor for detecting any obstructions near the floor that would not pass under the side portions 20,22. It will be understood that the detection plane 58 can be defined otherwise than by a single plate 62. For example, spaced apart plates or sensors (not shown) lying in the same plane could define the detection plane. That some parts of a structure defining the detection plane might not be coplanar would not remove the structure from the scope of the present invention. Furthermore, the vertical detection plane 58 of each detection device 56(A–D) is generally in alignment with a respective one of the side portions 20,22 of the gantry. A wing extension 64 is attached to the detection plate 62 for shielding the span between the detection plate and the gantry side portion 20,22. Conventional devices, such as an electric eye, can be used to detect obstructions on the table top.

As show in FIG. 1, the first gantry side portion 20 and second gantry side portion 22 are located on opposite sides of the truss table 12. The first detection device 56A is located on a forward end of the first gantry side portion 20 and the second detection device 56B is located on a rearward end of the first gantry side portion. The third detection device 56C is located on a forward end of the second gantry side portion 22 and a fourth detection device 56D is located on a rearward end of the second gantry side portion. Each of the four detection devices 56A–56D are of substantially the same construction. Accordingly, only one will be described in greater detail herein. It is to be understood that the detection devices may differ from one another, and that a different number of detection devices may be used without departing from the scope of the present invention.

Figure 3:
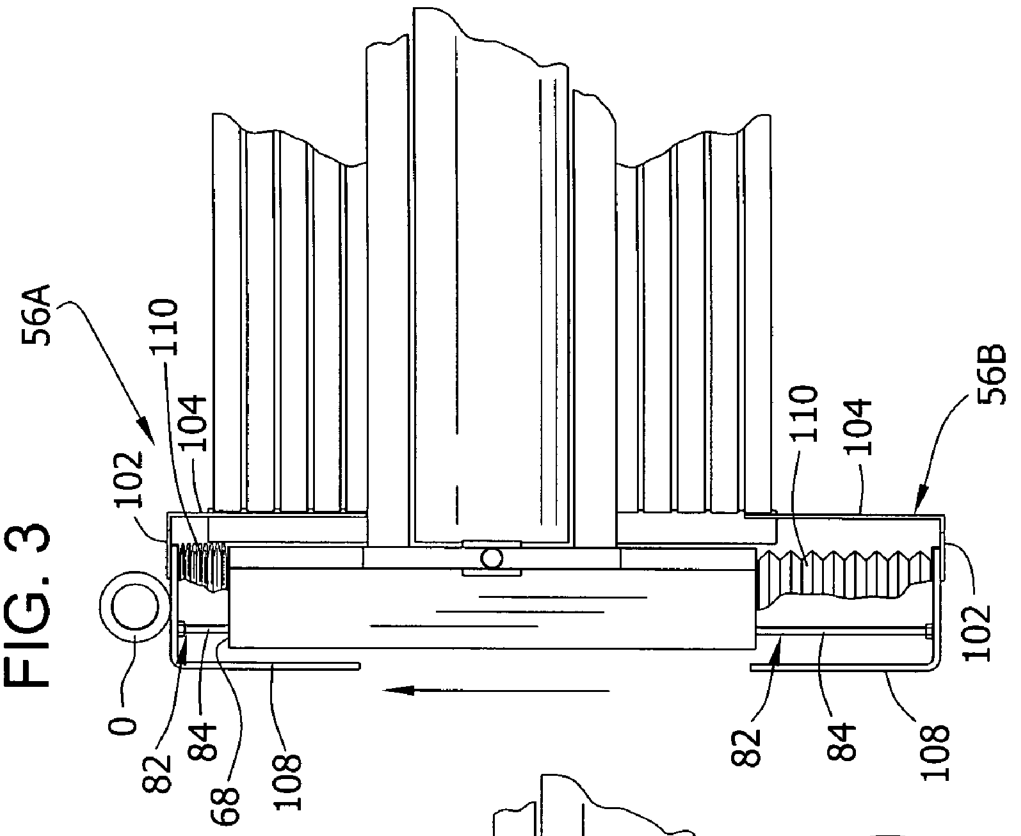
FIG. 3 is the top plan view of FIG. 2, but showing the obstruction detection device in a retracted position.
Figure 4:
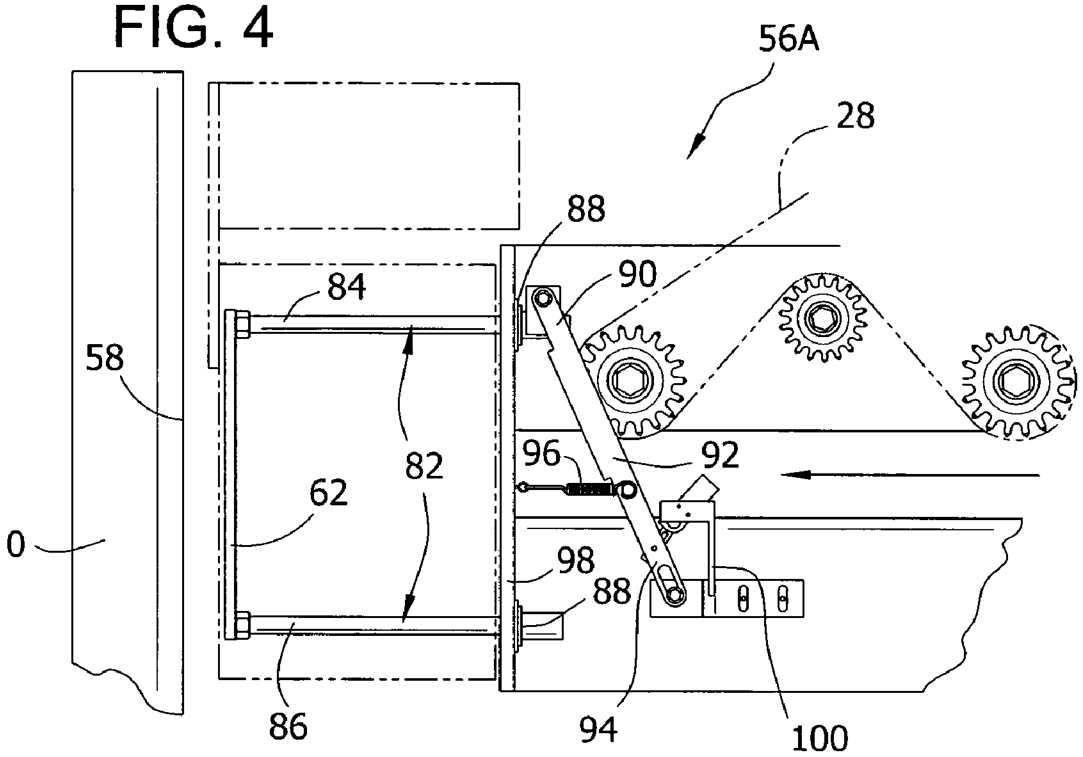
FIG. 4 is a schematic, fragmentary side elevation of a gantry press of the truss fabrication system showing the detection device in the extended position.
Figure 5:
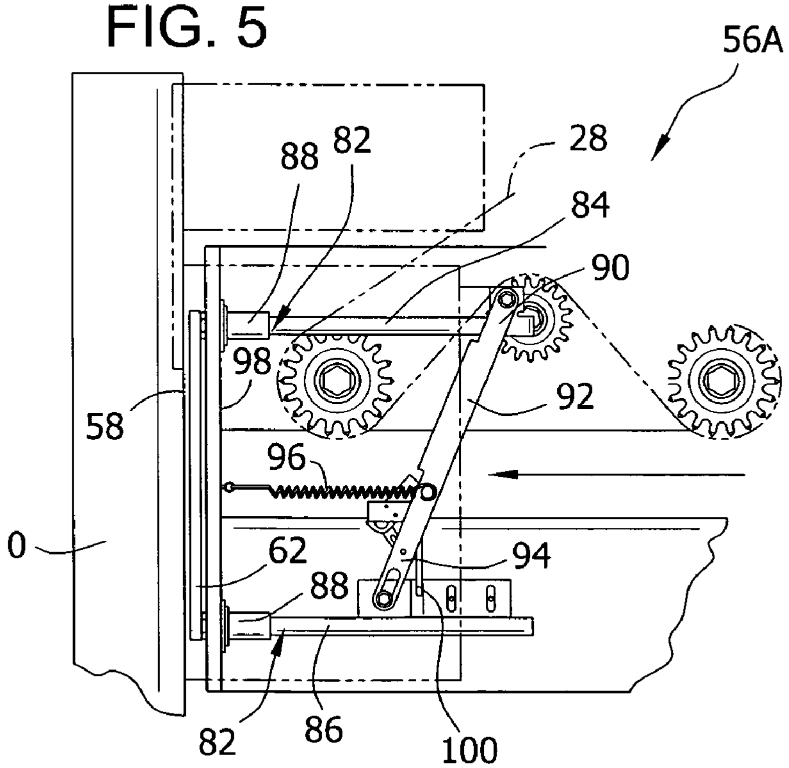
FIG. 5 is a schematic, fragmentary side elevation of the gantry press showing the detection device in the retracted position.

Referring to FIGS. 2–5, a fragment of the gantry press 14 of FIG. 1 is shown with the first and second obstruction detection devices 56A, 56B in extended positions outwardly from the forward and rearward ends of the first gantry side portion 20. The detection plate 62 of each detection device is mounted by a linkage (generally indicated at 82) in the form of a pair of rods 84, 86 on the first side portion 20 of the gantry 18. The rods 84,86 are mounted on the first side portion 20 in vertically spaced relation using slide bushings 88. As a result, the pair of rods 84, 86 support the plate 62 on the gantry 18 for substantially linear movement relative to the gantry. The upper rod 84 is pivotally attached to an upper end 90 of a lever arm 92. (See FIGS. 4 and 5). A lower end 94 of the lever arm is pivotally mounted on the first side portion 20. A spring 96, attached to the lever arm 92 and to an inner wall 98 of the first gantry side portion 20, biases the lever arm 92 and thus the upper rod 84, detection plate 62 and lower rod 86 to the extended position (FIG. 4). Accordingly, the first detection device 56A is resilient for yielding when engaged by an obstruction O and automatically returning the vertical detection plane 58 of the detection plate 62 to the predetermined distance from the gantry 18 when the obstruction is removed. It is to be understood that the resiliency of the first detection device 56A may be obtained in ways other than the use of a spring mechanism without departing from the scope of the present invention. The lower end 94 of the lever arm 92 is pivotally connected to an electrical switch 100. The switch is a conventional limit switch of suitable size and type. However, those of ordinary skill in the art will appreciate that other forms of switches or sensors may be used without departing from the scope of the present invention.

Figure 8:
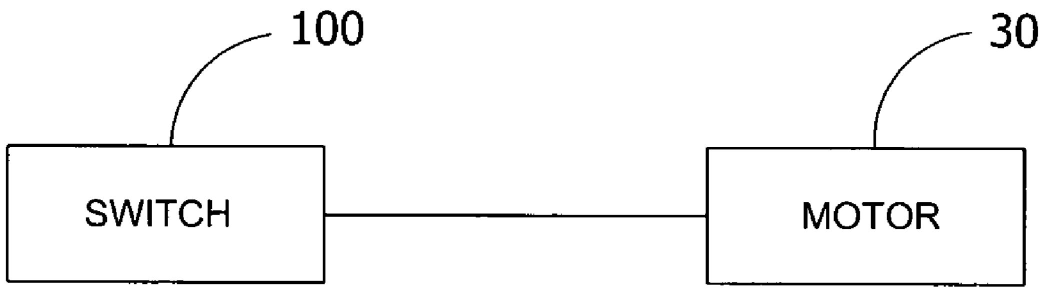
FIG. 8 is a schematic of an electrical shut-off of the gantry press.

In the retracted position (FIG. 5), the detection plate 62 is moved to a position adjacent the first gantry side portion 20. The rods 84,86, which support the detection plate, slide along the inner surfaces of the slide bushings 88 and substantially into the interior of the first gantry side portion 20. The upper end 90 of the lever arm 92 attached to the upper rod 84 travels with the upper rod from a position adjacent the slide bushing 88 to a position away from the slide bushing. The spring 96 mounted to the inner wall 98 of the gantry side portion is extended and its tension increases. The lower end 94 of the lever arm 92 is rotated to actuate the limit switch 100. The switch is operatively connected to the motor system 30 for stopping the roller 16 and drive wheels 27 when the detection plate 62 is in the retracted position (FIG. 8).

The previously mentioned wing extension 64 (FIG. 1) has a first surface 102 and a second surface 104. The first surface is perpendicular to the path of travel for extending the surface area of detection plate 62 adjacent the truss table top 38. The second surface 104 is parallel to the path of travel for shielding obstructions (not shown) on the table top from falling behind the first surface 102 of the wing.

Shielding, which covers the linkage 82, conforms to the linkage upon movement of the detection plate 62 relative to the first gantry side portion 20 to maintain coverage of the linkage. In one embodiment, the shielding comprises a side plate 108 and a bellows guard 110 (partially broken away in FIGS. 2 and 3). The side plate comprises a rigid sheet positioned adjacent the gantry side portion 20 and adapted to slide in front of the gantry side portion as the first detection device 56A travels between the extended and retracted positions. As shown, the side plate 108 is formed as one piece with the detection plate 62. The bellows 110 are foldable and unfoldable as the first detection device 56A moves between the extended and retracted positions to keep the linkage 82 covered. Although, it is to be understood that alternative shielding may be used without departing from the scope of the present invention.

Figure 2:
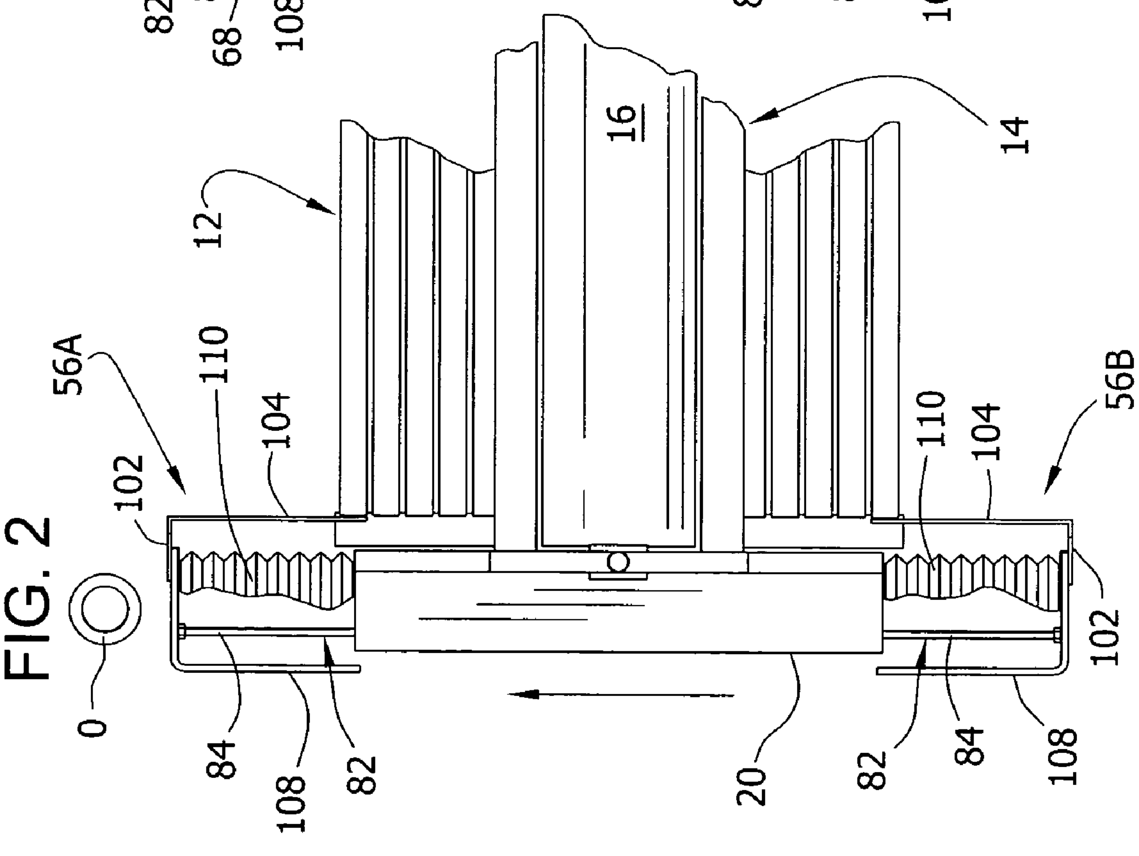
FIG. 2 is an enlarged, fragmentary top plan view of the system with parts broken away and the obstruction detection device in an extended position.
Figure 6:
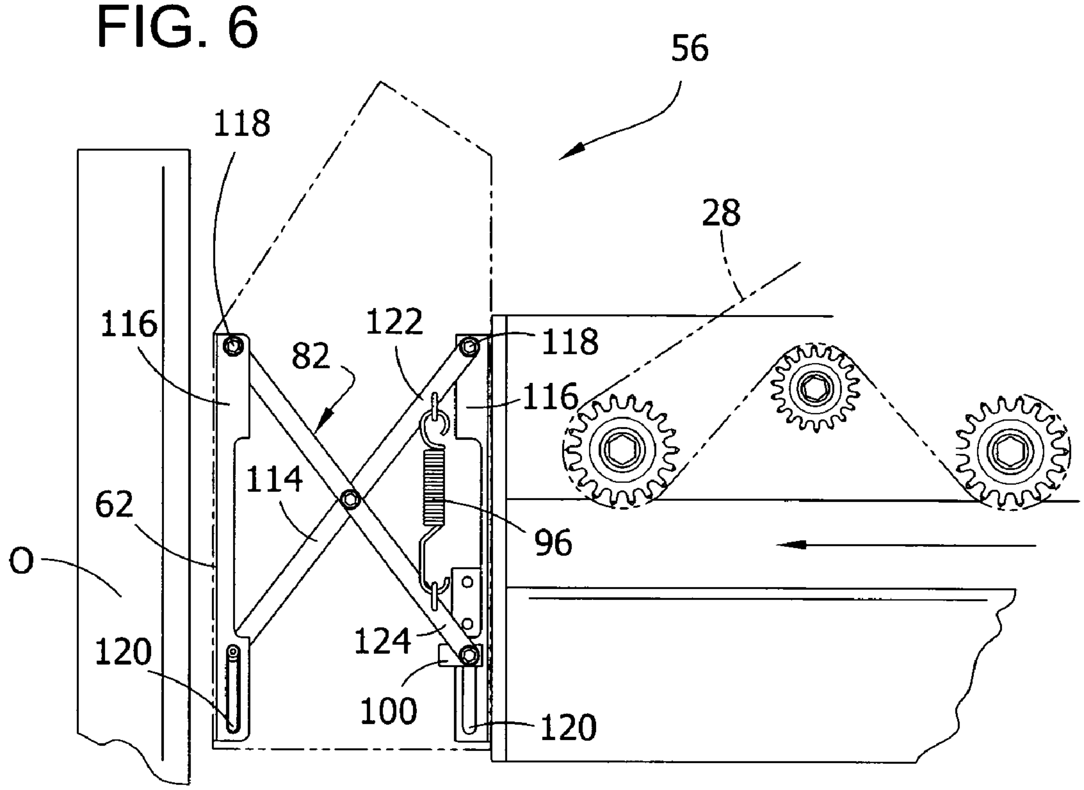
FIG. 6 is a schematic, fragmentary side elevation similar to FIG. 4 but showing another embodiment of the obstruction detection device.
Figure 7:
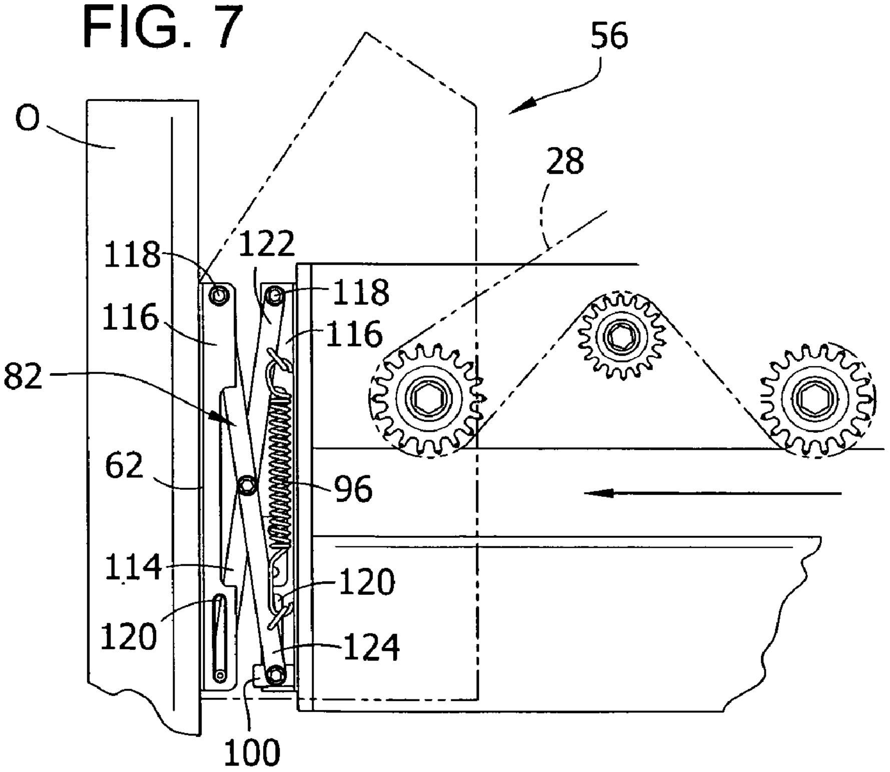
FIG. 7 is the schematic, fragmentary side elevation of FIG. 6, but showing the obstruction detection device in a retracted position.

In operation, an obstruction O along the path traveled by the gantry press may be encountered by the first detection device 56A (FIGS. 2, 4 and 6). As the gantry 18 proceeds to travel towards the obstruction O, the obstruction engages the detection plate 62. The detection plate yields by moving linearly from the extended position toward the retracted position. It is noted that the detection plate 62 is sized and arranged so that if it encounters an obstruction O anywhere in the detection plane 58 on the detection plate (or first surface 102 of the wing extension 64), the obstruction can be detected and the gantry press 14 stopped. For example if a worker is bending over or on the floor next to the table 12, he can still be detected. As the detection device 56 moves from the extended position toward the retracted position (FIGS. 3, 5 and 7), a portion of the linkage 82 moves to trip the electrical switch 100. The tripped switch shuts off the motor system 30 and thus, stops movement of the gantry 18. The amount of travel necessary for the linkage 82 to actuate the switch 100 can be set to any point of travel between the extended position and the retracted position. In the illustrated embodiment, the switch is tripped when the linkage moves only a short distance, e.g., less than 1 inch. The spring 96 mounted on the inner wall 98 of the first gantry side portion 20 is extended and its tension increases as the first detection device 56A moves toward the retracted position. The side plate 108 travels alongside the laterally outward facing portion of the gantry side portion 20 and the bellows guard 110 moves from an unfolded, extended position to a folded, receded position (FIG. 3).

In another embodiment (FIGS. 6 and 7), the linkage 82 comprises at least one set of crossed bars 114 pivotally interconnected with the detection plate 62 and the first gantry side portion 20 to collapse upon movement of the detection plate relative to the gantry 18. Brackets 116 having an upper engagement hole 118 and lower engagement slot 120 are used to fix the crossed bars 114 to the detection plate 62 and the gantry side portion 20. In the extended position (FIG. 6), the crossed bars 114 generally form a "X". A spring 96, connected to an upper portion 122 of one of the crossed bars 114 and the lower portion 124 of the other crossed bar, biases them toward the extended position. The switch 100 is positioned adjacent the lower engagement slot 120 of the bracket 116 attached to the housing 31 of the first side portion 20. The switch 100 is a conventional limit switch of suitable size and type. However, those of ordinary skill in the art will appreciate that other forms of switches or sensors may be used without departing from the scope of the present invention.

In the retracted position (FIG. 7), the detection plate 62 is moved to a position adjacent to the gantry side portion 20. The crossed bars 114 are pivoted about the upper bracket holes 118 to which they are attached and slide vertically downward in the lower slots 120 thus bringing the bars substantially side-by-side. The spring 96, which is connected to the crossed bars 114, is extended. The limit switch 100, which is mounted adjacent the lower slot 120 of the bracket attached to the gantry side portion 20, is tripped when the adjacent bar slides along the bracket engagement slot away from the switch. The tripped switch shuts off the motor system 30.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including"

and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A truss fabrication system for fabricating trusses from truss components including truss members and connectors joining together the truss members, the truss fabrication system comprising:

a table including a table top and legs supporting the table top and extending to the floor, the table top being adapted to receive truss components arranged with at least some connectors engaging at least some of the truss members; and a gantry press including a gantry mounted for movement along a path relative to the table over the table top for pressing the connectors into the truss members for joining the truss members together, a side portion of the gantry being located on a side of the table, a motor for driving movement of the gantry relative to the table, and an obstruction detection device mounted on the gantry for detecting obstructions in the path of the gantry, the detection device having portions which are spaced apart vertically thereby defining a vertical detection plane, the detection device comprising a detection plate defining the vertical detection plane thereon, a linkage supporting the plate on the gantry for substantially linear movement relative to the gantry upon contacting an obstruction, and a switch adapted to shut off the motor upon linear movement of the detection plate relative to the gantry, the detection plane being located a predetermined distance from the gantry, the detection device being adapted to detect the presence of all obstructions entering the plane at substantially the same time for stopping movement of the gantry.

2. A truss fabricating system as set forth in claim 1 wherein the detection device defines the vertical detection plane generally in alignment with the side portion of the gantry located on the side of the table.

3. A truss fabricating system as set forth in claim 2 wherein the vertical detection plane is arranged generally perpendicular to the path movement of the gantry.

4. A truss fabricating system as set forth in claim 1 wherein the detection device constitutes a first detection device located on a forward end of the gantry side portion, the system further comprising a second detection device located on a rearward end of the gantry side portion.

5. A truss fabricating system as set forth in claim 4 wherein the gantry side portion constitutes a first gantry side portion, and wherein the gantry further comprises a second gantry side portion located on an opposite side of the table from the first gantry side portion, the system further comprising a third detection device located on a forward end of the second gantry side portion and a fourth detection device located on a rearward end of the second gantry side portion, the first, second, third and fourth detection devices being of substantially the same construction.

6. A truss fabricating system as set forth in claim 1 wherein the linkage is resilient for automatically returning the vertical detection plane of the detection plate to said predetermined distance from the gantry.

7. A truss fabricating system as set forth in claim 6 wherein the linkage comprises at least two rods slidably mounted on the gantry side portion and attached to the detection plate.

8. A truss fabricating system as set forth in claim 6 wherein the linkage comprises bars pivotally interconnected with the detection plate and the gantry side portion to collapse upon movement of the detection plate relative to the gantry.

9. A truss fabricating system as set forth in claim 1 further comprising shielding covering the linkage, the shielding being adapted to conform to the linkage upon movement of the detection plate relative to the gantry side portion to maintain coverage of the linkage.

10. A truss fabrication system as set forth in claim 1 wherein at least a portion of said detection plane of the detection device is positioned at an elevation below the table top.

11. A truss fabrication system for fabricating trusses from truss components including truss members and connectors joining together the truss members, the truss fabrication system comprising:

a table including a table top and legs supporting the table top and extending to the floor, the table top being adapted to receive truss components arranged with at least some connectors engaging at least some of the truss members; and a gantry press including a gantry mounted for movement along a path relative to the table over the table top for pressing the connectors into the truss members for joining the truss members together, a side portion of the gantry being located on a side of the table, a motor for driving movement of the gantry relative to the table, and an obstruction detection device mounted on the gantry for detecting obstructions in the path of the gantry, the detection device defining a vertical detection plane located a predetermined distance from the gantry, the detection device being adapted to detect the presence of all obstructions entering the plane at substantially the same time for stopping movement of the gantry;

wherein the detection device is mounted on the gantry generally adjacent to the side of the table with the vertical detection plane being generally in alignment with the side portion of the gantry, such that the detection device is adapted for detecting obstructions which are located beside the table.

12. A truss fabrication system as set forth in claim 11 wherein at least a portion of said detection plane of the detection device is positioned at an elevation below the table top.

13. A truss fabricating system as set forth in claim 11 wherein the vertical detection plane is arranged generally perpendicular to the path movement of the gantry.

14. A truss fabricating system as set forth in claim 13 wherein the detection device comprises a detection plate defining the vertical detection plane thereon, a linkage supporting the plate on the gantry for substantially linear movement relative to the gantry upon contacting an obstruction, and a switch adapted to shut off the motor upon linear movement of the detection plate relative to the gantry.

15. A truss fabricating system as set forth in claim 14 wherein the detection device constitutes a first detection device located on a forward end of the gantry side portion, the system further comprising a second detection device located on a rearward end of the gantry side portion.

16. A truss fabricating system as set forth in claim 15 wherein the gantry side portion constitutes a first gantry side portion, and wherein the gantry further comprises a second gantry side portion located on an opposite side of the table from the first gantry side portion, the system further comprising a third detection device located on a forward end of the second gantry side portion and a fourth detection device located on a rearward end of the second gantry side portion, the first, second, third and fourth detection devices being of substantially the same construction.

* * * * *